US006805776B2

(12) United States Patent
Faris

(10) Patent No.: US 6,805,776 B2
(45) Date of Patent: Oct. 19, 2004

(54) MOVABLE ELECTRODE FLOW THROUGH CAPACITOR

(75) Inventor: Sadeg M. Faris, Pleasantville, NY (US)

(73) Assignee: InventqJaya Sdn Bhd, Selangor Darul Ehsan (MY)

( * ) Notice: Subject to any disclaimer, the term of this patent is extended or adjusted under 35 U.S.C. 154(b) by 115 days.

(21) Appl. No.: 10/213,523

(22) Filed: Aug. 7, 2002

(65) Prior Publication Data
US 2003/0029718 A1 Feb. 13, 2003

Related U.S. Application Data
(60) Provisional application No. 60/310,740, filed on Aug. 7, 2001.

(51) Int. Cl.[7] .............................. C25B 9/12; C02F 1/461
(52) U.S. Cl. ..................... 204/242; 204/208; 204/216; 210/248
(58) Field of Search ................... 210/198.2, 243; 204/206, 208, 212, 216, 222, 242

(56) References Cited

U.S. PATENT DOCUMENTS

| 3,642,605 | A | * | 2/1972 | Chenel et al. | 204/649 |
|---|---|---|---|---|---|
| 3,857,770 | A | * | 12/1974 | Keller | 204/559 |
| 3,962,069 | A | * | 6/1976 | Inoue et al. | 204/649 |
| 4,906,535 | A | * | 3/1990 | Hoge | 429/42 |
| 5,141,616 | A | * | 8/1992 | Heinke | 204/208 |
| 5,192,432 | A | | 3/1993 | Andelman | 210/198.2 |
| 5,196,115 | A | | 3/1993 | Andelman | 210/198.2 |
| 5,200,068 | A | | 4/1993 | Andelman | 210/198.2 |
| 5,360,540 | A | | 11/1994 | Andelman | 210/198.2 |
| 5,415,768 | A | | 5/1995 | Andelman | 210/198.2 |
| 5,538,611 | A | | 7/1996 | Otowa | 204/550 |
| 5,547,581 | A | | 8/1996 | Andelman | 210/656 |
| 5,620,597 | A | | 4/1997 | Andelman | 210/198.2 |
| 6,179,991 | B1 | * | 1/2001 | Norris et al. | 205/742 |

FOREIGN PATENT DOCUMENTS

WO       00 14304       3/2000

* cited by examiner

Primary Examiner—Roy King
Assistant Examiner—Harry D. Wilkins, III
(74) Attorney, Agent, or Firm—Ralph J. Cripino

(57) ABSTRACT

A flow through capacitor system is provided having one or more movable electrodes. A movable electrode may be in the form of a movable belt structure or a roller. The system further includes at least one subsystem for removing ions that accumulate at the one or more movable electrodes.

42 Claims, 4 Drawing Sheets

MOVABLE ELECTRODE FLOW THROUGH CAPACITOR

RELATED APPLICATIONS

The present application claims priority to U.S. Provisional Application Ser. No. 60/310,740 filed Aug. 7, 2001 entitled "Movable Electrode Flow Through Capacitor", the entire disclosure of which is incorporated by reference herein.

BACKGROUND OF THE INVENTION

1. Field of the Invention

The present invention relates to flow through capacitors, and more particularly to flow through capacitors for removing ionic substances from charged fluids.

2. Description of the Prior Art

Flow through capacitors have been developed to separate materials from fluid streams, such as salt from water. For example, Andleman U.S. Pat. Nos. 5,192,432, 5,196,115, 5,200,068, 5,360,540, 5,415,768, 5,547,581, 5,620,597, and U.S. Pat. No. 5,538,611 to Toshiro Otowa describe flow through capacitor systems which filters polluted and brackish water between alternating electrodes of activated carbon (the capacitors). When voltage is applied, salts, nitrates, totally dissolved solids and other adulterants in the water are attracted to the high surface area carbon material. Solids develop on the electrodes, and thus the process must be stopped to remove the contaminants as concentrated liquid. This is accomplished by short-circuiting of the electrodes.

This method has been taught as a better process for water desalinization than traditional systems like reverse osmosis, which passes through contaminants such as nitrates, promotes bacterial growth and wastes one or more gallons of water for every one it purifies. Further, ion exchange systems, also widely used, generate pollution and use strong acids, bases and salts to regenerate the resin.

Deionized water is employed in many commercial applications, such as semiconductor and chrome-plating plants, automobile factories, beverage production, and steel processing. Further, systems are contemplated in homes units, businesses, manufacturing and municipal facilities, and other applications which can recycle their water output, cutting costs and protecting the environment.

Of course, a prime objective flow through capacitor technology entails the desalinization of sea water at a reasonable cost, providing an inexhaustible supply of usable water to regions in need. Presently, advanced research is underway using new materials including carbon nanotubes. However, nanotechnology has yet to become an affordable and fully understood area.

Nonetheless, the water demands of the Third World are immediate. Two-thirds of the world population do not have access to clean water. Most disease in the developing world is water-related—more than 5 million people a year die of easily preventable waterborne diseases such as diarrhea, dysentery and cholera.

Plainly stated, potable water will be the most valuable commodity in the future. The world's population will double in the 50 to 90 years. Per capita water consumption increases while the supply deteriorates. 80% of the world's population lives within 200 miles of a coastline where water is available but not potable or suitable for agriculture. 70% of the ground water is brackish. 85% of all illness is associated with unsafe drinking water.

Therefore, it is needed in the world a low cost, safe, and efficient system and process to desalinate water, or to remove other substances from a material, as is needed.

SUMMARY OF THE INVENTION

The above-discussed and other problems and deficiencies of the prior art are overcome or alleviated by the several methods and apparatus of the present invention for removing ionic substances from fluids, such as removing salt from water. A flow through capacitor system is provided having one or more movable electrodes. A movable electrode may be in the form of a movable belt structure or a roller. The system further includes at least one subsystem for removing ions that accumulate at the one or more movable electrodes.

In one embodiment, one movable electrode is positioned and configured proximate to a second stationary electrode, to allow passage of a fluid therethrough. Upon application of a voltage across the electrodes, ions of a certain charge are attracted to the electrode of the opposite charge. For example, in desalinization of water, chlorine ions are attracted to the positive electrode, and sodium ions are attracted to the negative electrode. In the example, where the movable electrode is the negative electrode, sodium ions in a solid or solution may be removed from the movable negative electrode by a subsystem for removing ions. To remove the chlorine ions, the system may be short circuited. This may be particularly desirable wherein chlorine forms rapidly as a gas and evolves from the positive electrode (i.e., at a rate much higher than removal of sodium ions). The removal may be on an as-needed basis, or systematically, for example in a rapidly alternating manner.

In another embodiment, a pair of movable electrodes are positioned and configured proximate one another to allow passage of a fluid therethrough. Upon application of a voltage across the electrodes, ions of a certain charge are attracted to the electrode of the opposite charge. For example, in desalinization of water, chlorine ions are attracted to the positive electrode, and sodium ions are attracted to the negative electrode. Chlorine ions in a gaseous form (e.g., $Cl_2$) may be removed from the movable negative electrode by a first subsystem for removing ions. Sodium ions in a solid or solution may be removed from the movable positive electrode by a second subsystem for removing ions. Alternatively, chlorine ions may remain dissolved in a highly concentrated brackish that is removed.

The above-discussed and other features and advantages of the present invention will be appreciated and understood by those skilled in the art from the following detailed description and drawings.

DETAILED DESCRIPTION OF THE ILLUSTRATIVE EMBODIMENTS

Herein disclosed is a flow through capacitor system having one or more movable electrodes. The system may further include a subsystem for removing ions that accumulate or are absorbed or adsorbed at the one or more movable electrodes.

Figure 1:
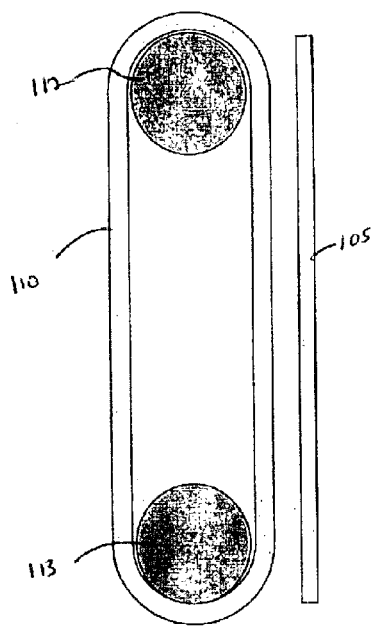
FIG. 1 is a schematic representation of a movable electrode flow through capacitor.

Referring now to FIG. 1, a flow through capacitor system 100 includes a movable electrode 110 and a stationary electrode 105. The electrode 105 is a sheet or other suitable configuration positioned with respect to the movable electrode 110 to allow fluid flow between the electrodes 105, 110. The movable electrode 110 is depicted in the form of a movable belt, which is positioned on a pair of rollers 112, 113. Both electrodes 105, 110 generally include a high surface area conductive constituent, and optionally a current collector.

Figure 2:
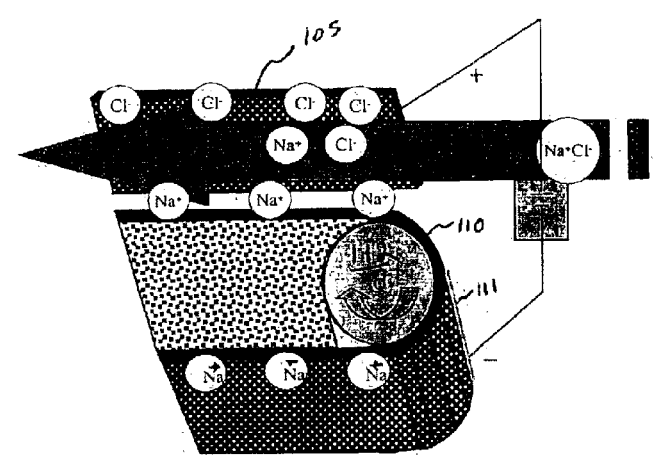
FIG. 2 is a schematic depiction of a process for desalinating water.

Upon application of a voltage (e.g., from a DC source, and contacting the electrodes via suitable contacts, such as contact 111 associated with the movable electrode 110) and passage of an ionic fluid, and referring now to FIG. 2, ions of appropriate charge are attracted to the electrodes 105, 110, forming an electric double layer. In the Figure, as depicted, the movable electrode 110 is the negative electrode, thus when the ionic fluid is salt water, sodium ions are absorbed or adsorbed by the electrode 110 and chlorine ions are absorbed by the positive electrode 105. The water exiting the system 100, therefore, may be substantially free of salt, depending on the applied voltage, the contact time, the surface area of the electrodes, the distance between the electrodes, and a multitude of other factors that may all be optimized to attain the desired degree of fluid deionization (e.g., a water stream substantially free of salt).

Figure 3:
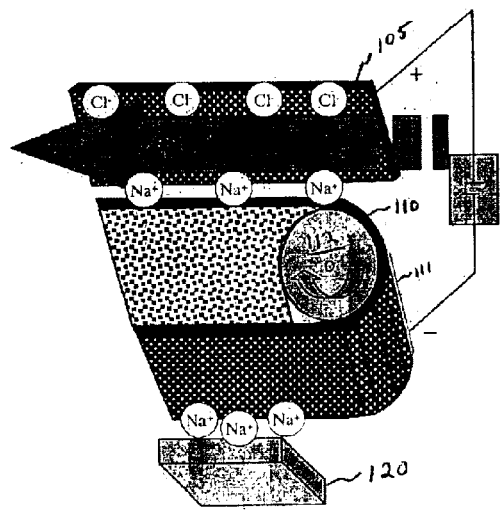
FIG. 3 is a schematic depiction of a process including an extraction subsystem.

With the inclusion of the movable electrode 110, many benefits may be derived. An ion extraction subsystem 120 may be implemented on a side of the movable electrode opposite the fluid flow, as shown in FIG. 3. The ion extraction system 120, which will be described more fully herein in description of other system embodiments, allows for a continuous removal of some or all of the ions absorbed or adsorbed on the movable electrode 110. Thus, unlike conventional flow through capacitor systems, which require short circuiting of both electrodes to discharge ions in a more concentrated effluent, the system 100 may effectively be utilized while only neutralizing the electrode 105, when an extraction subsystem 120 is employed to remove ions from the movable electrode 105. The ions may be removed with or without a fluid stream. For example, the ions may be collected as from the extraction subsystem 120. Further, when the electrode 105 is neutralized (e.g., by local application of a magnetic field or electric field of a positive charge, or by interrupting the applied voltage to the electrode), chlorine gas may evolve from the absorbed or adsorbed chlorine ions in the electrode 105, not requiring a waste effluent. The collected sodium ions and the chlorine gas may be recombined to form pure NaCl. Alternatively, the sodium and the chlorine may be isolated and collected.

Further, in systems 100 not employing the extraction subsystem 120, desorption of ions is similar in one facet with conventional systems—both electrodes are neutralized (e.g., short circuited). However, the need for a separate waste stream is obviated. The system may be configured, by appropriate timing of the movable electrode 110, for example, to recombine sodium and chlorine ions between the electrodes. Further, the system may be configured to isolate the sodium and chlorine ions, such that sodium metal and chlorine gas may be separately collected.

Figure 4:
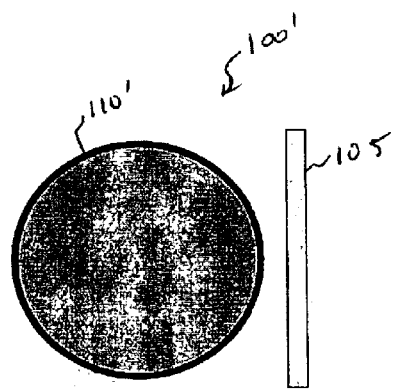
FIG. 4 is a schematic representation of another movable electrode flow through capacitor.

Referring now to FIG. 4, an alternative embodiment of a system 100' includes a movable cathode 110', in the form of a roller.

Figure 5:
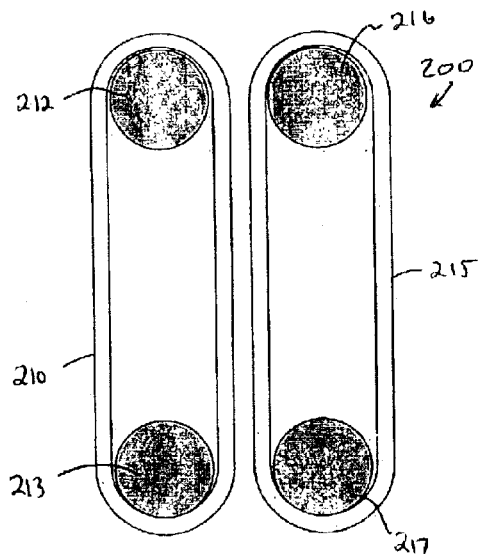
FIG. 5 is a schematic representation of still another movable electrode flow through capacitor.

Referring now to FIG. 5, another embodiment of a flow through capacitor system is depicted. A flow through capacitor system 200 includes a pair of movable electrodes 210, 215. The movable electrodes 210, 215 are in the form of belts supported on pairs of rollers 212, 213, and 217, 218, respectively.

Figure 6:
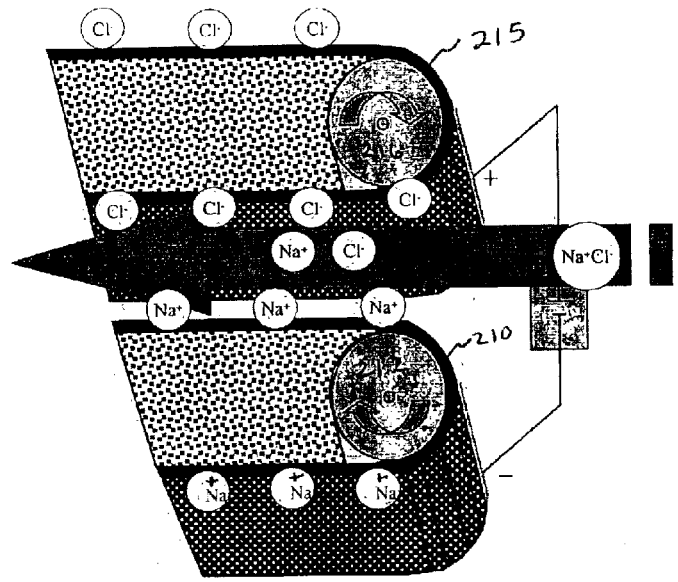
FIG. 6 is a schematic depiction of a process for desalinating water.

Upon application of a voltage and passage of an ionic fluid, and referring now to FIG. 6, ions of appropriate charge are attracted to the electrodes 210, 215 forming an electric double layer at each electrode. In the Figure, as depicted, the electrode 210 is the negative electrode, and the electrode 215 is the positive electrode, thus when the ionic fluid is salt water, sodium ions are absorbed and/or adsorbed by the electrode 210 and chlorine ions are absorbed and/or adsorbed by the positive electrode 215. The water exiting the system 200, therefore, may be substantially free of salt, depending on the applied voltage, the contact time, the surface area of the electrodes, the distance between the electrodes, the speed of the movable electrodes 210, 215, and a multitude of other factors that may all be optimized to attain the desired degree of fluid deionization (e.g., a water stream substantially free of salt).

With the inclusion of the movable electrodes 210, 215, many benefits may be derived. Desorption of ions may be effectuated with neutralization (e.g., short circuiting) of the electrodes. However, the need for a separate waste stream is obviated. The system may be configured, by appropriate timing of the movable electrodes 210, 215, for example, to recombine sodium and chlorine ions into salt between the electrodes. Further, the system may be configured to isolate the sodium and chlorine ions, such that sodium metal and chlorine gas may be separately collected.

Figure 7:
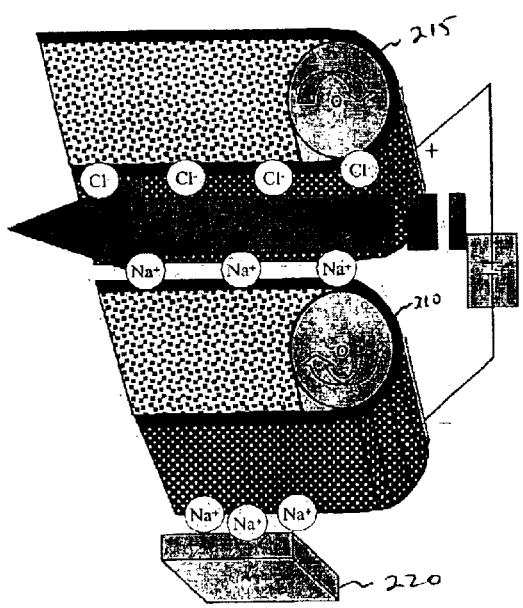
FIG. 7 is a schematic depiction of a process including an extraction subsystem.

Referring now to FIG. 7, a system 200 is depicted including extraction subsystems 220, 225, corresponding to the electrodes 210, 215, respectively. The extraction subsystems 220, 225 may include, but are not limited to, magnetic field producing systems, electric field producing systems, vacuum collection systems, conveyor systems, and combinations comprising at least one of the foregoing. For example, extraction subsystem 220 may comprise a negative electric or magnetic field producing system, which, when activated, attracts the positive sodium ions on the electrode 210. A vacuum system may also be employed. Likewise, extraction subsystem 225 may comprise a positive electric or magnetic field producing system, which, when activated, attracts the negative chlorine ions on the electrode 215.

Figure 8:
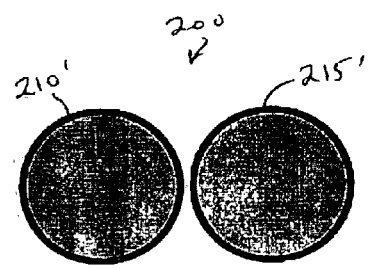
FIG. 8 is a schematic representation of still another movable electrode flow through capacitor.

Referring now to FIG. 8, an alternative embodiment of a system 200' includes a movable cathode 210' and a movable cathode 215', in the form of rollers.

Figure 9:
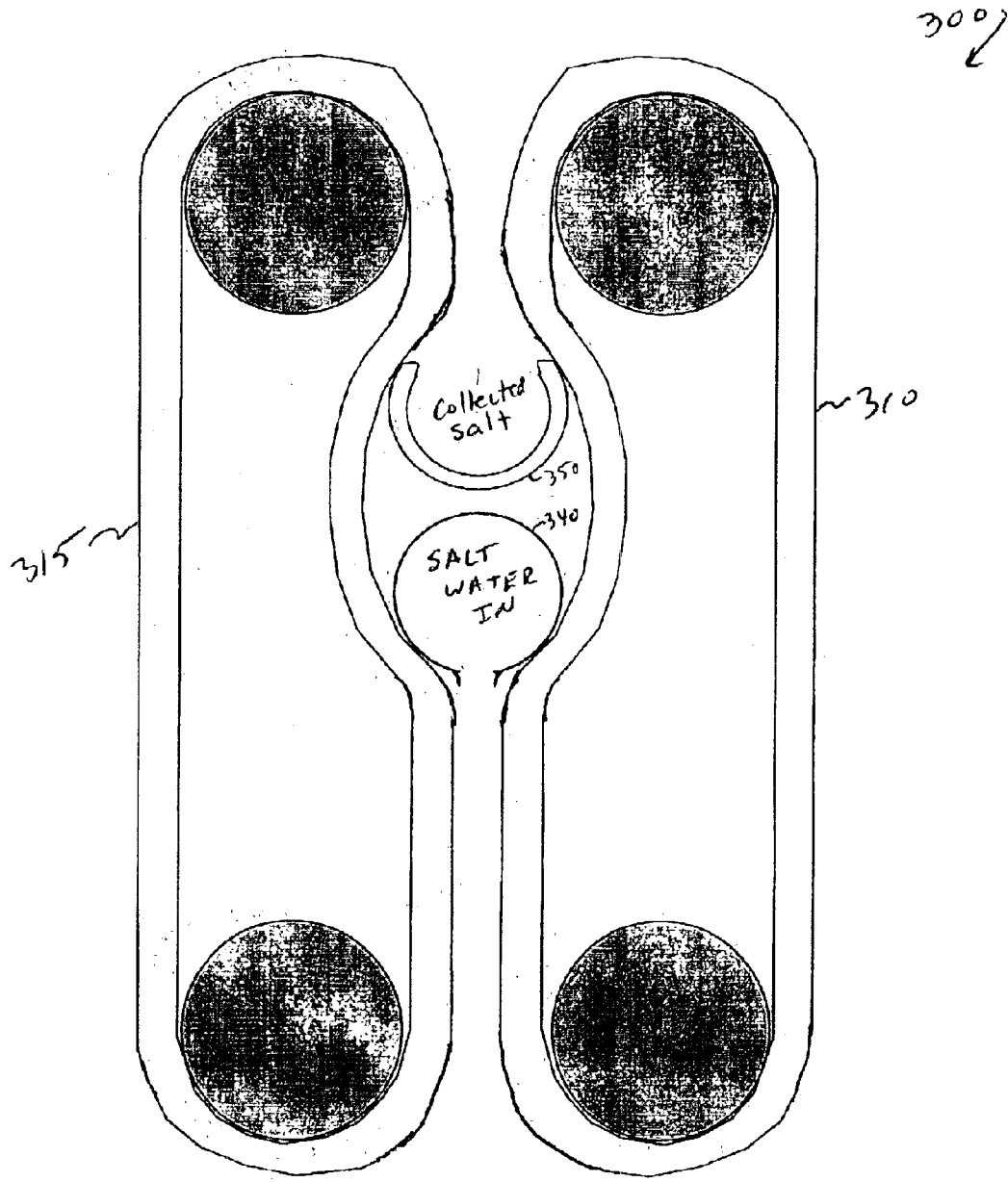
FIG. 9 is a schematic representation of yet another embodiment of a movable electrode flow through capacitor system.

Referring now to FIG. 9, a system 300 includes a pair of movable electrodes 310, 315. Salt water to be desalinated is fed to the system 300 at a point other than the ends of the electrodes, e.g., via a conduit 340. As the ions are formed on the electrodes, they carry over the movable belt electrodes and recombine over a collector 350. The recombination of the ions to form the salt may be effectuated by a variety of methods, including locally neutralizing the electrodes at the vicinity of the controlled salt, or forming and configuring the electrode belts and DC voltage source connections (not shown) such that the electrodes are not activated in the vicinity of the collector 350.

Figure 10:
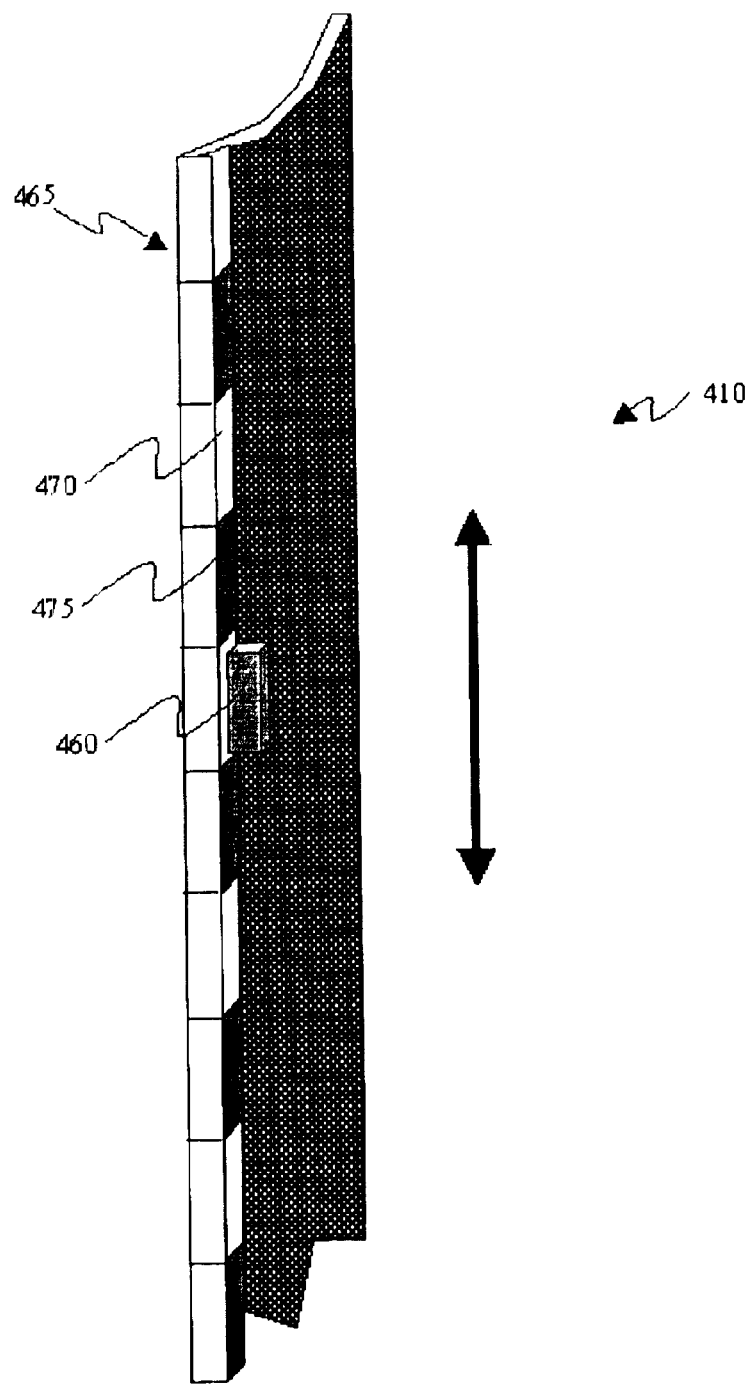
FIG. 10 is an embodiment of an alternative electrode belt structure.

Referring now to FIG. 10, an exemplary electrode belt 410 is depicted. Belt 410 is associated with a contact 460, operably connected to a voltage source. The electrode 410 may serve as the positive, negative, or both positive and negative electrode in any of the above described embodiments. In this embodiment, a contact edge 465 of the electrode 410 includes alternating conductive portions 470 and non-conductive portions 475. This arrangement simplifies the process of neutralizing the electrode 410 for removing ions therefrom. The conductive and non-conductive portions may alternate at equal intervals, or at non-equal intervals, depending on the ion extraction requirements. Further, the conductive and non-conductive portions may be included on one or both edges of the belt, or on the roller structures of FIGS. 4 and/or 8.

Another variation of a belt electrode includes extending one or more non-conductive or insulating portions throughout the width of the belt. This will allow for discrete sections having current passing therethrough, allowing for simplified ion collection at the sections of the electrode not subject to the electrical current.

A high surface area conductive constituent alone may be formed as the electrodes, or may be supported on appropriate supports (conductive or non-conductive, depending on the form of the electrodes). Alternatively, a current collector and a high surface area conductive constituent may be in the form of layers, or may be a single layer, for example, as described in An exemplary air cathode is disclosed in U.S. Pat. No. 6,368,751, entitled "Electrochemical Electrode For Fuel Cell", to Wayne Yao and Tsepin Tsai, issued Apr. 9, 2002, which is incorporated herein by reference in its entirety. The electrode described in this disclosure may be modified with a layer of a low-density plastic material (drawn and cut in the form of tape or belt) to impart flexibility and strength to a belt structure used in the embodiments of the present invention.

The high surface area conductive material employed in the flow-through capacitor may comprise a wide variety of electrically conductive materials, including, but not limited to, graphite, activated carbon particles, activated carbon fibers, activated carbon particles formed integrally with a binder material, woven activated carbon fibrous sheets, woven activated carbon fibrous cloths, non-woven activated carbon fibrous sheets, non-woven activated carbon fibrous cloths; compressed activated carbon particles, compressed activated carbon particles fibers; azite, metal electrically conductive particles, metal electrically conductive fibers, acetylene black, noble metals, noble metal plated materials, fullerenes, conductive ceramics, conductive polymers, or any combination comprising at least one of the foregoing. The high surface area material may optionally include coatings or plating treatments with a conductive material, such as palladium, platinum series black, to enhance electrical conductivity. The high surface area material may also be treated with chemicals such as alkali, e.g., potassium hydroxide, or a halogen, e.g., fluorine; to increase the surface area and conductivity. Activated carbon material of greater than about 1000 square meters per gram surface area are preferred, but it is understood that lower surface area materials may also be employed, depending on factors including but not limited to the distance between the electrodes, the voltage applied, the desired degree of ion removal, the speed of the movable cathodes, and the configuration of the movable cathodes.

For example, in accordance with a first fabrication technique, a thin metal layer (e.g. nickel) of about 1 to 10 microns thickness is applied to the surface of low-density plastic material (drawn and cut in the form of tape or belt). The plastic material should be selected so that it is stable in the presence of an the ionized fluid. The function of this thin metal layer is to provide efficient electrical conductance at the electrode surface. Thereafter, high surface area material, optionally mixed with a binder material, is applied as a coating (e.g. about 10 to 1000 microns thick) upon the surface of the thin metal layer. The high surface area material layer should have sufficient porosity to allow ions within the ionized fluid to flow with minimum electrical resistance between the electrode.

In accordance with a third fabrication technique, high surface area material is mixed with a low-density plastic base material and drawn into electrically-conductive tape or belt. The low-density plastic material should be selected so that it is stable in the presence of the ionized fluid. The electrically-conductive tape or belt should have sufficient porosity to allow ions within the ionized fluid to flow with minimum electrical resistance between the electrode. Then a thin metal layer (e.g. nickel) of about 1 to 10 microns thickness is applied to the surface of the electrically-conductive tape.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A flow through capacitor system comprising:
   a first electrode having a first electrical contact associated with the first electrode;
   a second electrode;
   wherein the first electrode is movable,
   further wherein the first electrode comprises an edge portion for contacting the first electrical contact, the edge portion comprising at least one region of electrically conductive material and at least one region of non-electrically conductive material.

2. The flow through capacitor system as in claim 1, wherein the movable electrode comprises a movable belt structure or a roller.

3. The flow through capacitor system as in claim 1, further comprising a subsystem for removing ions that accumulate at the one or more movable electrodes.

4. The flow through capacitor system as in claim 1, wherein the first electrode comprises a high surface area conductive constituent.

5. The flow through capacitor system as in claim 4, wherein the first electrode further comprises a current collector.

6. The flow through capacitor system as in claim 1, wherein the second electrode comprises a high surface area conductive constituent.

7. The flow through capacitor system as in claim 6, wherein the second electrode further comprises a current collector.

8. The flow through capacitor system as in claim 1, further comprising a second electrical contact associated with the second electrode and a voltage source operably coupled to the first electrical contact and the second electrical contact.

9. The flow through capacitor system as in claim 8, wherein upon application of a voltage and passage of an ionic fluid, ions of opposite charge of the corresponding electrode are attracted to the first electrode and the second electrode.

10. The flow through capacitor system as in claim 8, wherein the voltage applied to the first electrode is interrupted when the first electrical contact is registered with the at least one region of non-electrically conductive material.

11. A flow through capacitor system as in claim 1, further wherein the first electrode comprises discrete sections separated by electrically insulating material.

12. A flow through capacitor system comprising:
a first electrode;
a second electrode;
wherein the first electrode is movable,
further wherein the first electrode comprises discrete sections separated by electrically insulating material.

13. The flow through capacitor system as in claim 12, wherein the movable electrode comprises a movable belt structure or a roller.

14. The flow through capacitor system as in claim 12, further comprising a subsystem for removing ions that accumulate at the one or more movable electrodes.

15. The flow through capacitor system as in claim 12, wherein the first electrode comprises a high surface area conductive constituent.

16. The flow through capacitor system as in claim 15, wherein the first electrode comprises a current collector.

17. The flow through capacitor system as in claim 12, wherein the second electrode comprises a high surface area conductive constituent.

18. The flow through capacitor system as in claim 17, wherein the second electrode further comprises a current collector.

19. The flow through capacitor system as in claim 12, further comprising a first electrical contact associated with the first electrode and a second electrical contact associated with the second electrode, and a voltage source operably coupled to the first electrical contact and the second electrical contact.

20. The flow through capacitor system as in claim 19, wherein upon application of a voltage and passage of an ionic fluid, ions of opposite charge of the corresponding electrode are attracted to the first electrode and the second electrode.

21. The flow through capacitor system as in claim 19, wherein the first electrode comprises an edge portion for contacting the first electrical contact, the edge portion comprising at least one region of electrically conductive material and at least one region of non-electrically conductive material, such that the voltage applied to the first electrode is interrupted when the first electrical contact is registered with the at least one region of non-electrically conductive material.

22. A flow through capacitor system comprising:
a first movable electrode; and
a second movable electrode,
wherein at least one of the first electrode or the second electrode comprises an edge portion for contacting an electrical contact associated with the one of the first electrode or the second electrode, the edge portion comprising at least one region of electrically conductive material and at least one region of non-electrically conductive material.

23. The flow through capacitor system as in claim 22, wherein the first movable electrode comprises a movable belt structure or a roller and the second movable electrode comprises a movable belt structure or a roller.

24. The flow through capacitor system as in claim 22, further comprising a first subsystem for removing ions that accumulate at the first movable electrode and a second subsystem for removing ions that accumulate at the second movable electrode.

25. The flow through capacitor system as in claim 22, wherein the first electrode comprises a high surface area conductive constituent.

26. The flow through capacitor system as in claim 25, wherein the first electrode further comprises a current collector.

27. The flow through capacitor system as in claim 22, wherein the second electrode comprises a high surface area conductive constituent.

28. The flow through capacitor system as in claim 27, wherein the second electrode further comprises a current collector.

29. The flow through capacitor system as in claim 22, further comprising a voltage souree, a first electrical contact associated with the first electrode, and a second electrical contact associated with the second electrode.

30. The flow through capacitor system as in claim 29, wherein upon application of a voltage and passage of an ionic fluid, ions of opposite charge of the corresponding electrode are attracted to the first electrode and the second electrode.

31. The flow through capacitor system as in claim 22, wherein the first electrode and the second electrode each are associated with an electrical contact, and further wherein the first electrode and the second electrode each comprise an edge portion for contacting the electrical contacts, the edge portions each comprising at least one region of electrically conductive material and at least one region of non-electrically conductive material, such that the voltage applied to the electrode is interrupted when the electrical contact is registered with the at least one region of non-electrically conductive material.

32. The flow through capacitor system as in claim 22, further wherein the first electrode, the second electrode, ar both the first electrode and second electrode comprises discrete sections separated by electrically insulating material.

33. A flow through capacitor system comprising:
a first movable electrode; and
a second movable electrode;
wherein the first electrode, the second electrode or both the first electrode and second electrode compnse discrete sections separated by electrically insulating material.

34. The flow through capacitor system as in claim 33, wherein the movable electrode comprises a movable belt structure or a roller.

35. The flow through capacitor system as in claim 33, further comprising a subsystem for removing ions that accumulate at the one or more movable electrodes.

36. The flow through capacitor system as in claim 33, wherein the first electrode comprises a high surface area conductive constituent.

37. The flow through capacitor system as in claim 36, wherein the first electrode further comprises a current collector.

38. The flow through capacitor system as in claim 33, wherein the second electrode comprises a high surface area conductive constituent.

39. The flow through capacitor system as in claim 38, wherein the second electrode further comprises a current collector.

40. The flow through capacitor system as in claim 33, further comprising a first electrical contact associated with the first electrode and a second electrical contact associated with the second electrode, and a voltage source operably coupled to the first electrical contact and the second electrical contact.

41. The flow through capacitor system as in claim 40, wherein upon application of a voltage and passage of an ionic fluid, ions of opposite charge of the corresponding electrode are attracted to the first electrode and the second electrode.

42. The flow through capacitor system as in claim 40, wherein the first electrode comprises an edge portion for contacting the first electrical contact, the edge portion comprising at least one region of electrically conductive material and at least one region of non-electrically conductive material, such that the voltage applied to the first electrode is interrupted when the first electrical contact is registered with the at least one region of non-electrically conductive material.

* * * * *